Dec. 31, 1957 W. F. SPANG ET AL 2,817,873
EXTRUDING APPARATUS
Filed June 15, 1956

INVENTORS
WILLIAM F. SPANG
WESLEY E. LAZOTT
BY
Kenway, Jenney, Witter & Hildreth
ATTORNEYS

2,817,873

EXTRUDING APPARATUS

William F. Spang, Medfield, and Wesley E. Lazott, Hopkinton, Mass., assignors to Needham Manufacturing Company Inc., Needham Heights, Mass., a corporation of Massachusetts Application June 15, 1956, Serial No. 591,580

1 Claim. (Cl. 17—32)

This invention relates to extruding apparatus and more particularly to the extruding of ground meat and the like into strip form adapted to be severed into individual patties. Machines heretofore known for this purpose have provided for varying the thickness of the extruded product but have no means for varying its width. It is frequently desired not only to vary the width of the product extruded but it may also be desirable to extrude the same into a plurality of relatively narrow and independent strips. The primary object of our invention herein is to provide novel mechanism for performing these functions.

More specifically our extruding apparatus embodies a segmental gate at the exit end of the extruding chamber and comprising a plurality of adjustable segments whereby the extruding slot can be reduced in width as required or divided into a plurality of relatively narrow extruding slots by selectively closing one or more of the gate segments. The production of novel mechanism of this nature for the purpose described comprises a further object of the invention.

These and other features of the invention will be best understood and appreciated from the following description of a preferred embodiment thereof selected for purposes of illustration and shown in the accompanying drawing in which—

Figure 1:
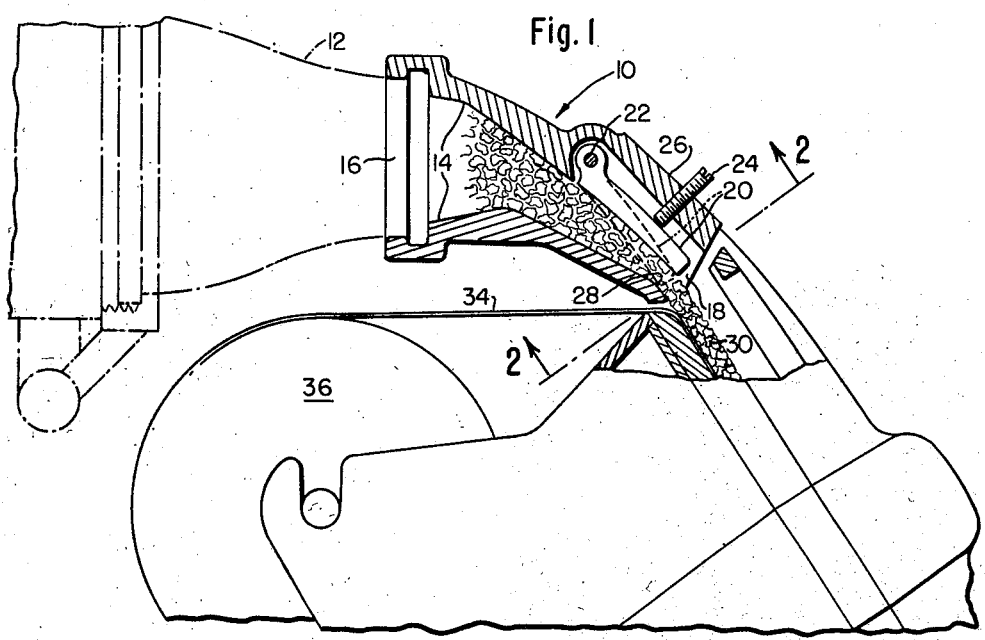
Fig. 1 is a fragmentary side elevation, partially in longitudinal section, of an extruding machine embodying our invention.

The extruding machine as illustrated in Fig. 1 is in the form of an attachment 10 adapted to be applied to an annular adaptor 12 which is in turn applied to the delivery end of a meat grinding machine.

The attachment 10 includes a housing having an extruding chamber extending therethrough and open at the feeding and delivery ends. The inner walls 14 of the chamber are gradually inclined from a circular configuration at the feeding end 16 to a relatively wide and shallow rectangular slot disposed horizontally at the delivery end 18. The upper wall at the delivery end of the chamber embodies a gate including a plurality of segments 20 in juxtaposed relation horizontally across the delivery end 18, and independently adjustable on a common horizontal axis 22. Each segment is engaged by a stop screw 24 threaded into the top wall of the housing at 26.

Figure 2:
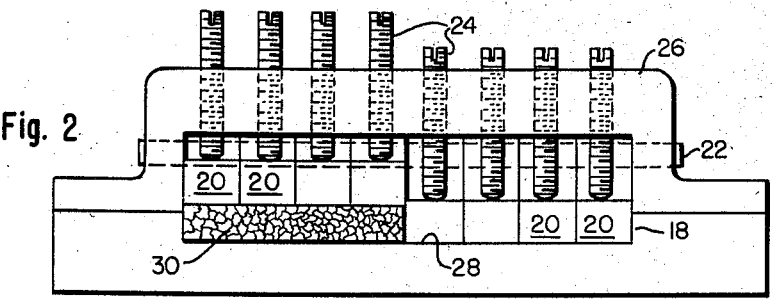
Fig. 2 is an enlarged sectional view taken on line 2—2 of Fig. 1.
Figure 3:
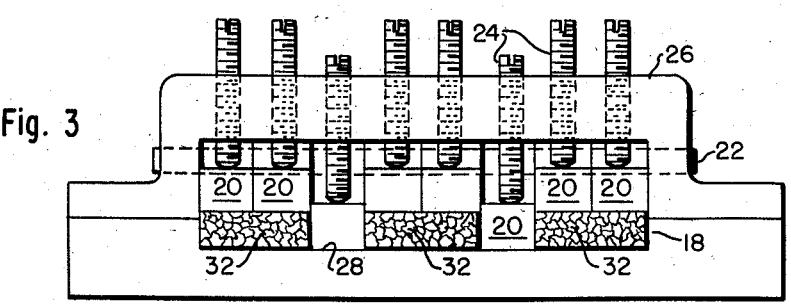
Fig. 3 is an enlarged view like Fig. 2 and illustrating a modified adjustment of certain parts.
Figure 4:
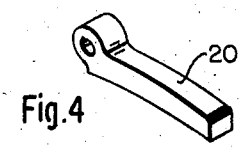
Fig. 4 is a perspective view of a gate segment employed.

Each gate segment 20 is pivotally adjustable from a maximum open position permitted by the housing at 26 to a closed zero position in which the segment engages the bottom wall of the chamber at 28 and thus closes the extruding slot portion therebeneath. The segments 20 can therefore be selectively adjusted to any desired position between the fully closed and fully open positions and held in such adjusted positions by the stop screws 24. The thickness of the extruded product can thereby be predetemined as desired and the extruded strip 30 can be reduced in width, as illustrated in Fig. 2, or divided into a plurality of independent strips 32, as illustrated in Fig. 3. It will be understood that numerous variations of the adjustments shown in Figs. 2 and 3 are possible. The extruded strip feeds forwardly from the extruding chamber onto a paper strip 34 provided from a roll 36.

Having thus disclosed our invention what we claim as new and desire to secure by Letters Patent is:

Apparatus for extruding ground meat and the like, comprising a housing having an extruding chamber extending therethrough and open at feeding and delivery ends, the inner walls of the chamber being gradually inclined from a circular configuration at the feeding end to a relatively wide and rectangular slot disposed horizontally at the delivery end and adapted to extrude ground meat therethrough, a segmental gate comprising a plurality of juxtaposed elements pivoted at their rear ends on a horizontal axis within and to the upper wall of the housing and extending forwardly therefrom to said slot, said forwardly extending portion of the elements providing therealong the upper meat contacting surface of said gradually inclined walls and said elements each having at its free end a straight and continuous portion from edge to edge thereacross in opposed relation to the bottom wall of the slot, and a plurality of adjustable stop members carried by the housing above and disposed respectively to engage said elements, said elements being independently adjustable about said axis toward and from said bottom wall to vary the gap between each element and the wall from zero to a predetermined maximum and said adjustable stop members being adapted to support said elements in adjusted position.

References Cited in the file of this patent

UNITED STATES PATENTS

| 1,699,086 | Winkie | Jan. 15, 1929 |
| 2,154,333 | Kampfer | Apr. 11, 1939 |
| 2,209,824 | Louisot et al. | July 30, 1940 |
| 2,720,679 | Ratliff | Oct. 18, 1955 |
| 2,760,227 | Andy | Aug. 28, 1956 |